INVENTOR.
Katsuro Nakamura
BY
H. Edward Mestern

June 18, 1968 KATSURO NAKAMURA 3,389,378

MEMORY SYSTEM

Filed Aug. 6, 1965 4 Sheets-Sheet 2

INVENTOR.
Katsuro Nakamura

BY

H. Edward Mestern

June 18, 1968 KATSURO NAKAMURA 3,389,378

MEMORY SYSTEM

Filed Aug. 6, 1965 4 Sheets-Sheet 3

INVENTOR.
Katsuro Nakamura

BY

H. Edward Mestern

INVENTOR.
Katsuro Nakamura

BY

M. Edward Mestern

United States Patent Office 3,389,378
Patented June 18, 1968

3,389,378
MEMORY SYSTEM

Katsuro Nakamura, Minato-ku, Tokyo-to, Japan, assignor to Toko Kabushiki Kaisha, Tokyo-to, Japan, a joint-stock company

Filed Aug. 6, 1965, Ser. No. 477,687
Claims priority, application Japan, Aug. 8, 1964, 39/45,164
2 Claims. (Cl. 340—172.5)

ABSTRACT OF THE DISCLOSURE

A memory system of the destructive reading-out type wherein a circuit connects a sense amplifier directly with a digit-driver without passing through the information-buffer-register of the system thus eliminating the time lag needed for setting the information-buffer-register from the time for rewriting.

The present invention relates to a memory system of the destructive reading-out type, in which matrix type memory elements are formed by use of transverse and longitudinal electroconductive wires and adapted to carry out writing-in of information at the cross points of said transverse and longitudinal wires.

As is well known, in the conventional destructive reading-out type memory devices, since the information which has been written in is destroyed in the case of reading-out of said information, it is necessary to carry out immediate rewriting by use of the information which has been read out. In this case, since the time required for the rewriting-in is included in the memory cycle of time required for carrying out memory operation of the destructive reading-out. In this case, since the time required for the rewriting-rewriting as much as possible in order to obtain high speed memory operation.

It is an essential object of this invention to provide a novel memory system in which the above mentioned time required for rewriting-in is extremely shortened.

According to the present invention, said object and other objects of the present invention have been attained by a memory system in which there is provided a connection circuit connecting the sense amplifier directly with the digit-driver without passing through the information-buffer register whereby the time lag required for setting the information-buffer register is caused to be excluded from the time required for rewriting operation.

The novel features which characterize this invention are set forth with particularity in the appended claims, but the present invention itself, both as to its organization and method of operation together with further objects and advantages thereof may best be understood by reference to the following description taken in connection with the accompanying drawings in which like parts are designated by like reference numerals and characters, and in which:

Figure 1:
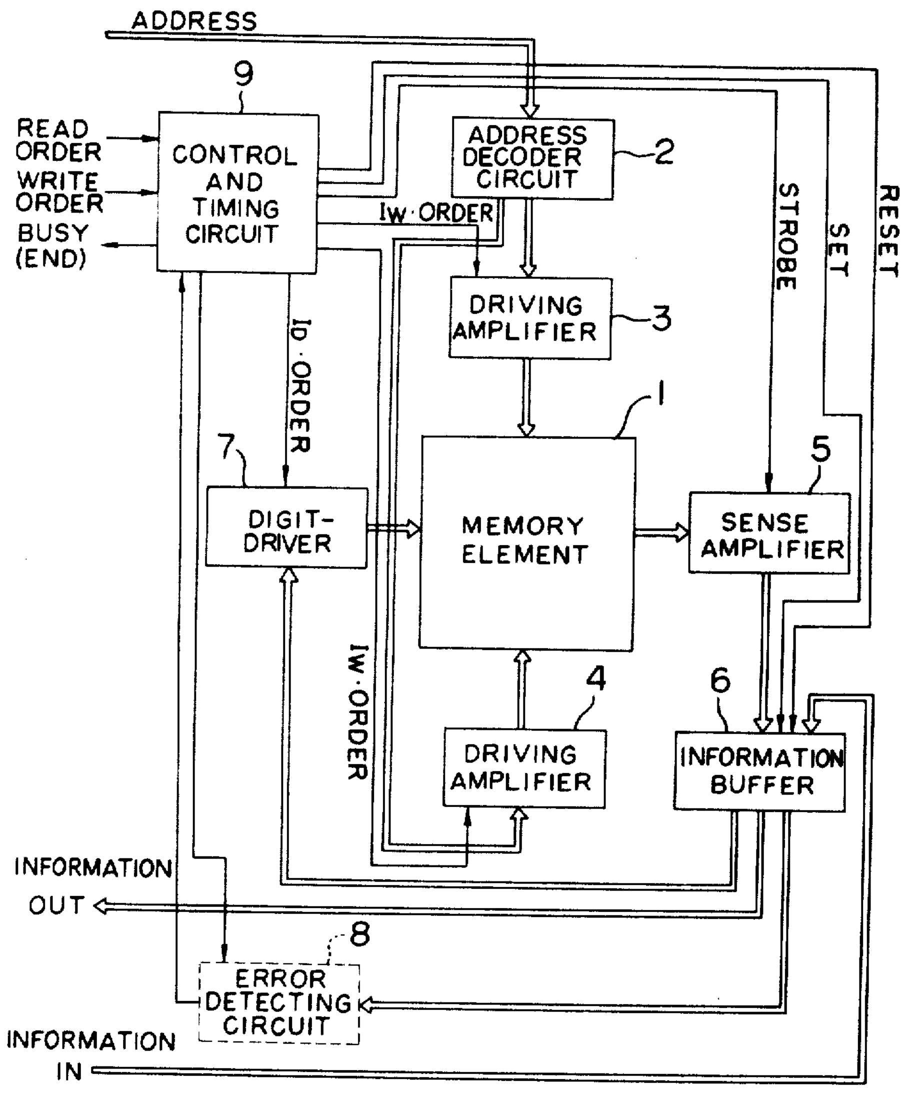
FIG. 1 is a block diagram showing a conventional memory system of the destructive reading-out type.

The construction and memory operation of a conventional memory system will be described in connection with FIGS. 1, 2, and 3 in order to make comprehension of the present invention clear. The conventional memory system comprises, as shown in FIG. 1, an address decoder circuit 2 adapted to write and read out any information into and from any address of a matrix type memory element 1, driving amplifiers 3 and 4 adapted to carry out writing-in and reading-out of any information, a sense-amplifier 5 adapted to amplify and shape the read-out signal so as to obtain a sense output, and an information-buffer-register 6 which is set by the sense-output of the amplifier 5 in accordance with the writing information. For setting the said information-buffer-register, a certain time lag $T_d$ is generally required.

In the system of FIG. 1, when the information-buffer-register is set, a rewriting signal is sent out from a control and timing circuit 9, whereby a pulse signal corresponding to the read-out information is produced, and this pulse signal is amplified by means of a digit-driver 7 (corresponding to an information writing driver). This amplified signal is sent into the memory element 1. If an error-detecting circuit 8 is provided, error detection is carried out after setting of the information-buffer-register.

Control of production and timing of the pulse waves utilized in the circuits are carried out by the control and timing circuit 9. In this case, timing becomes as shown in FIG. 2 in case the reading-out system is a word organizing system and becomes as shown in FIG. 3 in case the reading-out system is a current-coincident system.

Of course, although both systems are different in their manner of reading-out, they can be represented by the block diagram shown in FIG. 1. However, in the case of the word organizing system, the amplifiers 3 and 4 shown in FIG. 1 become, respectively, a word-switch and a word-driver, while in the case of the current-coincident system, the amplifiers 3 and 4 become, respectively, an X-driver and a Y-driver, and the digit-driver 7 becomes a Z-driver.

However, the above mentioned cases are equivalent to each other in the following facts (A) and (B).

(A) The fact that a sense-output pulse is produced by amplifying a reading-out signal and then by shaping said amplifier signal by means of the pulse sent out from the control and timing circuit 9, whereby the information-buffer-register is set by said sense-output pulse.

(B) The fact that rewriting-in is carried out by sending a rewriting signal from a control circuit after the information-buffer-register has been set.

In both of the above mentioned cases, the time required for carrying out rewriting operation includes a time lag $T_d$ required for setting of the information-buffer-register by the sense-output pulse.

Figure 2:
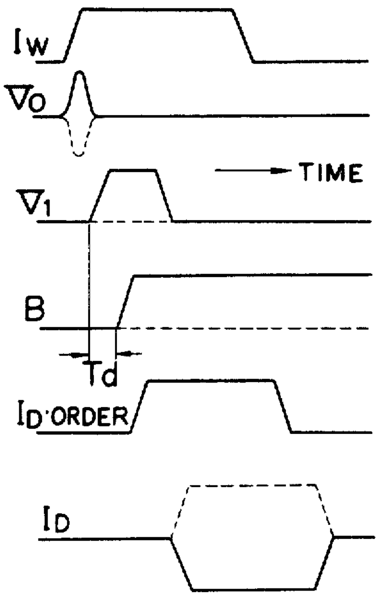
FIGS. 2 and 3 are characteristic waves showing timing of the memory operation of the system of FIG. 1.

Referring to FIG. 2, the characters $I_w$, $V_0$, $V_1$, B, $I_D$-order, and $I_D$ represent, respectively, a word-driving pulse, a reading-out signal, a sense output, an output pulse of the information-buffer-register, a digit-order pulse, and a digit-driving pulse.

Figure 3:
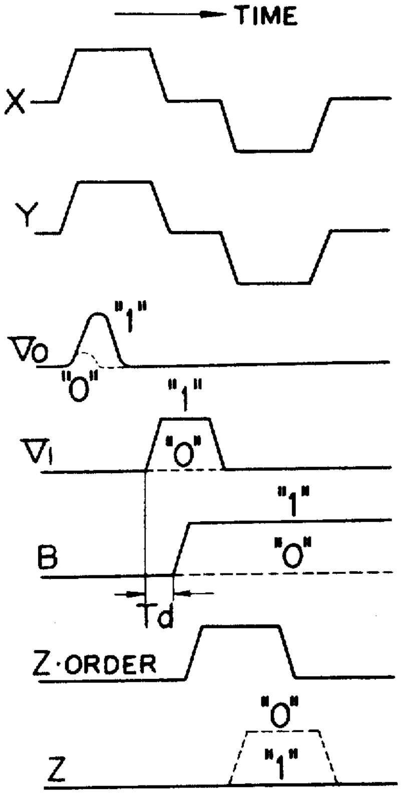

Furthermore, in FIG. 3, the characters X, Y, Z, and Z-order represent, respectively, driving pulse of the X-driver, driving pulse of the Y-driver, driving pulse of the Z-driver, and Z-driving-order pulse. Of course, the characters $V_0$, $V_1$, and B in FIG. 3 represent, respectively, the same quantities as those represented by $V_0$, $V_1$ and B in FIG. 2.

In FIG. 1, the doubled arrow line represents one representative wire among a plurality of the same wires, and $I_w$-order represents a word-driving-order pulse.

I have described the construction and operation of a conventional memory system in order to make the present invention comprehensive.

According to the present invention, the above mentioned time lag $T_d$ required for setting the information-buffer-register is caused to be excluded from the rewriting time. For this purpose, in the present invention there is provided a circuit 10 adapted to feed back the output of the sense amplifier 5 directly into the digit-driver 7 without causing said output to pass through the information-buffer-register as shown in FIG. 4.

Figure 4:
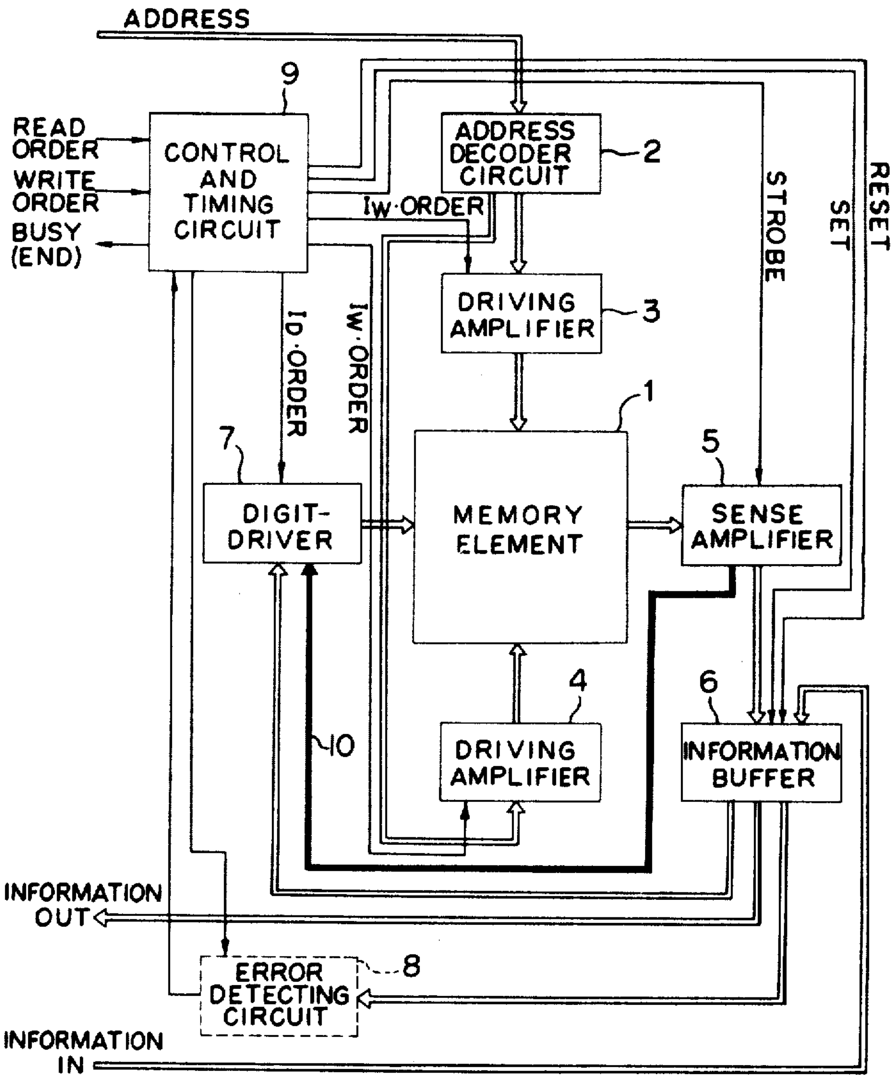
FIG. 4 is a block diagram of a memory system according to the present invention.
Figures 5, 6, 7:
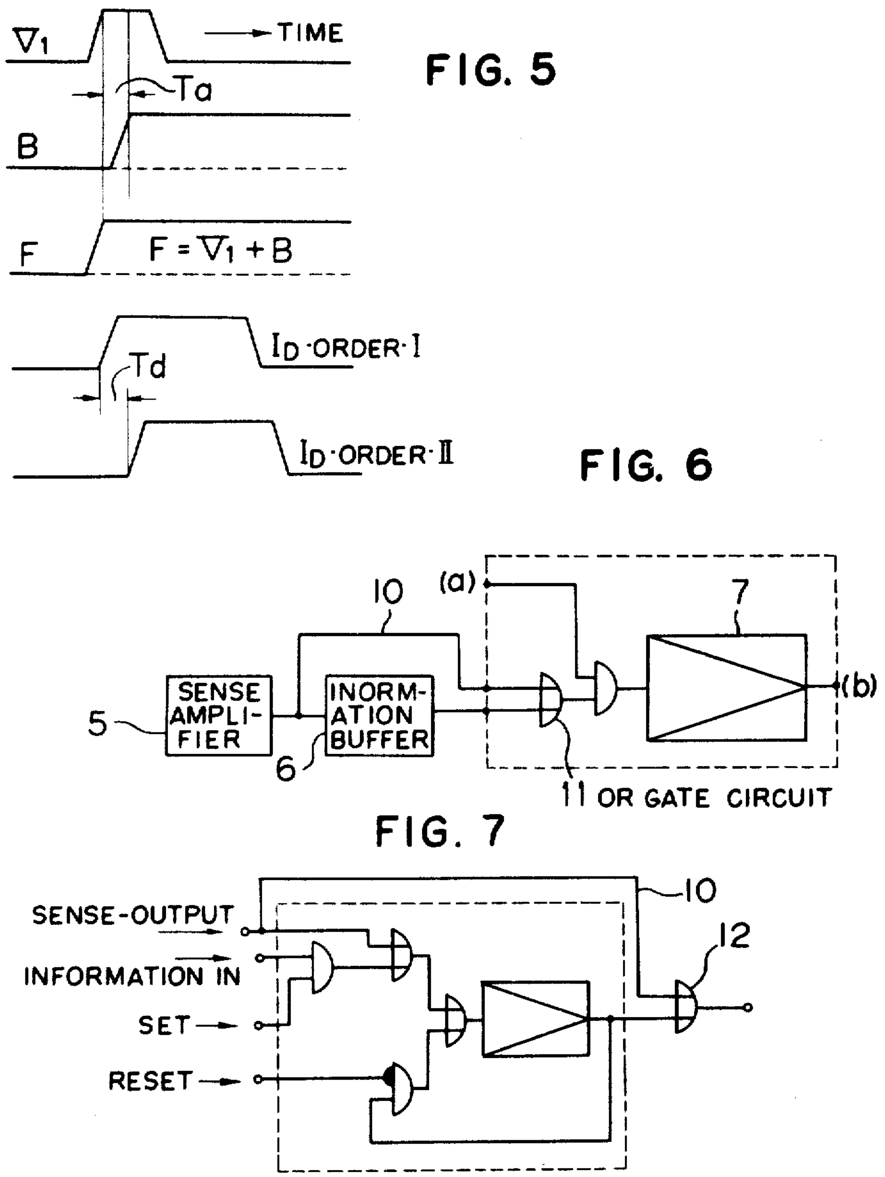
FIG. 5 shows characteristic waves indicating timing of the memory operation of the system of FIG. 4.
FIG. 6 is a circuit diagram of the digit-driver of the system of FIG. 4.
FIG. 7 is a circuit diagram of the information-buffer-register of the system illustrated in FIG. 4.

When the circuit 10 is removed from the system of FIG. 4, this system becomes equal to that of FIG. 1. However, by the provision of the circuit 10, the time lag of the information-buffer-register can be equivalently eliminated by combining the sense-output $V_1$ with the output B of the information-buffer-register which has been set by said output $V_1$ by means of the OR circuit, as shown in FIG. 5. In this case, the combined output is indicated by the wave F. Consequently, a rewriting information pulse can be produced by applying a rewriting signal ($I_D$-order) upon production of the sense output $V_1$ and by producing AND output of said rewriting signal and a reading-out information, whereby the rewriting time can be shortened by the time lag $T_d$ required for setting the information-buffer-register.

In FIG. 5 ($I_D$-order-I) and ($I_D$-order-II) indicate timing in the case of the present invention and in the conventional case, respectively.

One actual embodiment of the digit-driver to which the present invention is applied is shown in FIG. 6, in which an OR gate circuit 11 for directly introducing the sense output of the sense 11 for directly introducing the sense output of the sense amplifier 5 into the package (shown by dotted line) of the digit-driver 7 is provided, and in which *a* and *b* are, respectively, terminals to be connected to the control circuit and memory element.

FIG. 7 relates to an embodiment of the invention, in which an OR gate circuit 12 connected to the digit-driver is additionally provided in the package (shown by dotted line of the conventional information-buffer-register).

Of course, in both cases, the connection circuit 10 connecting the sense amplifier 5 directly with the digit-driver 7 is utilized as in the case of FIG. 4.

While I have illustrated and described specific embodiments of the memory system according to the present invention, various other arrangements and applications will occur to those skilled in the art. Consequently, the present invention is not limited to the details of the embodiments disclosed in this specification, but cover all modifications which fall within the spirit and scope of the present invention.

What I claim is:

1. In a memory system comprising a matrix type memory element array wherein the input side of a sense amplifier for amplification of a read-out signal is connected to the matrix type memory element; the output side of the sense amplifier is connected to the input side of an information-buffer-register for storage of the read-out information; the output side of said register is connected to the input side of a digit-driver; and the output side of said digit-driver is connected to said memory element, thereby to compose a rewriting line; the improvement which comprises an auxiliary rewriting line connected directly between the output side of said sense amplifier and the input side of said digit-driver; thereby excluding the time lag required for setting the information-buffer-register from the time required for rewriting operations.

2. A memory system according to claim 1, wherein the amplified read-out signals passed over said auxiliary rewriting line and the output of the information-buffer-register set by said amplified read-out signals are combined in an OR gate.

References Cited

UNITED STATES PATENTS

| | | | |
|---|---|---|---|
| 3,054,989 | 9/1962 | Melmed et al. | 340—174 |
| 3,193,809 | 7/1965 | Ullman | 340—174 |
| 3,196,404 | 7/1965 | Furlong et al. | 340—172.5 |

ROBERT C. BAILEY, *Primary Examiner.*

PAUL J. HENON, *Examiner.*

R. B. ZACHE, *Assistant Examiner.*